(12) United States Patent
Harimoto et al.

(10) Patent No.: US 7,281,449 B2
(45) Date of Patent: Oct. 16, 2007

(54) CONNECTING ROD AND BEARING-EQUIPPED CONNECTING ROD

(75) Inventors: Kazuyoshi Harimoto, Iwata (JP); Masahiko Kataoka, Iwata (JP)

(73) Assignee: NTN Corporation, Osaka (JP)

( * ) Notice: Subject to any disclaimer, the term of this patent is extended or adjusted under 35 U.S.C. 154(b) by 74 days.

(21) Appl. No.: 10/300,902

(22) Filed: Nov. 21, 2002

(65) Prior Publication Data

US 2003/0101847 A1   Jun. 5, 2003

(30) Foreign Application Priority Data

Nov. 22, 2001   (JP)   .............................. 2001-357322

(51) Int. Cl.
*F16C 7/00*   (2006.01)
(52) U.S. Cl. ..................... 74/579 E; 74/579 R; 74/588
(58) Field of Classification Search .............. 74/579 E, 74/579 R, 588; 123/41.83, 193.6; F16C 7/08, F16C 33/58, 7/00
See application file for complete search history.

(56) References Cited

U.S. PATENT DOCUMENTS

| | | | | | |
|---|---|---|---|---|---|
| 2,120,016 | A | * | 6/1938 | Bugatti | ........................ 74/588 |
| 3,822,609 | A | * | 7/1974 | Kotoc | ...................... 74/579 E |
| 4,369,742 | A | * | 1/1983 | Everts | ..................... 123/193.6 |
| 4,403,525 | A | * | 9/1983 | Bongers | .................. 74/579 E |
| 4,554,893 | A | * | 11/1985 | Vecellio | .................... 123/41.83 |
| 4,836,045 | A | * | 6/1989 | Lobig | ...................... 74/579 E |
| 4,939,952 | A | * | 7/1990 | Romer et al. | .............. 74/579 E |
| 5,544,413 | A | * | 8/1996 | Stevens et al. | ......... 29/888.092 |
| 5,787,763 | A | * | 8/1998 | Fatehpour et al. | ........ 74/579 E |
| 5,862,719 | A | * | 1/1999 | Kono | ....................... 74/579 E |
| 6,038,943 | A | * | 3/2000 | Vogelsang | ............... 74/579 E |
| 6,560,869 | B1 | * | 5/2003 | Schlegel et al. | ......... 29/888.09 |

FOREIGN PATENT DOCUMENTS

| | | | | |
|---|---|---|---|---|
| EP | 000598664 A1 | * | 5/1994 | ............... 74/579 E |
| FR | 2 348 779 | * | 11/1977 | |
| JP | 62-215118 | | 9/1987 | |
| JP | 1- 104435 | * | 4/1989 | |
| JP | 2-280938 | * | 11/1990 | ............... 74/579 E |
| JP | 2002-327730 | | 11/2002 | |
| JP | 2007-85493 | * | 4/2007 | |

OTHER PUBLICATIONS

McGraw-Hill Dictionary of Scientific and Technical Terms, McGraw Hill Book Company, 1976, p. 203.*
Translation of Japanese Kokai Patent Application No. Hei 2[1990]-280938, US Patent & Trademark Office, Oct. 2006.*
Translation of JP 2002-327730, Naoki et al., STIC, Mar. 2007.*
English language Abstract for Japanese Patent No. 2002-327730.
Foreign Office Action for Application No. 2001-357322; dated Jul. 4, 2006.

* cited by examiner

*Primary Examiner*—Vinh T. Luong (57) ABSTRACT

To provide a connecting rod assembly and a bearing-equipped connecting rod both manufacturable easily and inexpensively, a connecting rod assembly 2 includes a plurality of separate rod segments 3A and 3B each having a big end portion 3*a*, a small end portion 3*b* and a shank portion 3*c* intervening between the big and small end portions 3*a* and 3*b*. The separate rod segments 3A and 3B are laminated together to provide a laminated rod structure 3, and a ring member 5 is press-fitted to each of the big and small end portions 3*a* and 3*b* of the respective separate rod segments 3A and 3B forming the laminated rod structure 3 to thereby integrate the separate rod segments 3A and 3B together. The ring member 5 defines an outer race of, for example, a shell type bearing 4 and this shell type bearing 4 is press-fitted in the big and small end portions 3*a* and 3*b* of the laminated rod structure 3 to thereby provide a bearing-equipped connecting rod 1.

6 Claims, 6 Drawing Sheets

CONNECTING ROD AND BEARING-EQUIPPED CONNECTING ROD

BACKGROUND OF THE INVENTION

1. Field of the Invention

The present invention relates to a connecting rod assembly used in association with an engine and also to a bearing-equipped connecting rod.

2. Description of the Prior Art

The connecting rod is generally manufactured by forging or sintering a steel rod or a plate member or by means of a constrained compressive molding. Also, the connecting rod is often prepared from a steel plate by the use of a press work.

Where the connecting rod is manufactured by the use of a forging or sintering technique, the number of process steps is generally large, hampering reduction in cost of manufacture. Also, when it comes to boring to be performed on the connecting rod, grinding is necessitated and, therefore, the number of process steps increases correspondingly.

Figure 7:
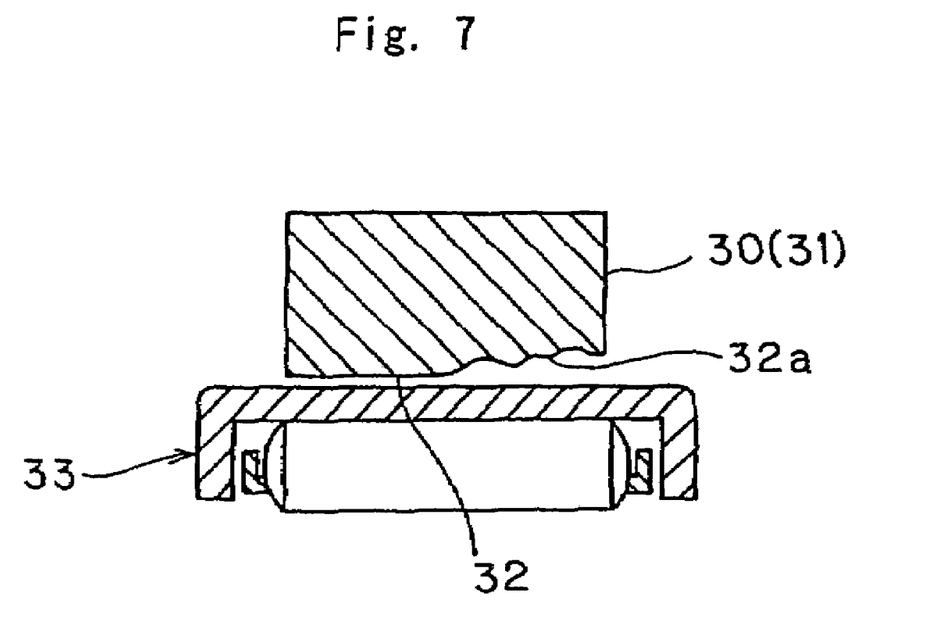
FIG. 7 is a fragmentary side sectional view, on an enlarged scale, of a portion of the conventional connecting rod.

In the case of the connecting rod formed by the use of a standard blanking technique, by the influences brought about by a cut plane 32a formed on an inner peripheral surface 32 of one or both of big and small end portions 30 and 31 as shown in FIG. 7, a bearing member 33 tends to tilt when the bearing member 33 is press-fitted into the inner peripheral surface 32. Because of this, the post processing such as grinding or polishing is required, resulting in increase of the cost of manufacture.

Figure 8:
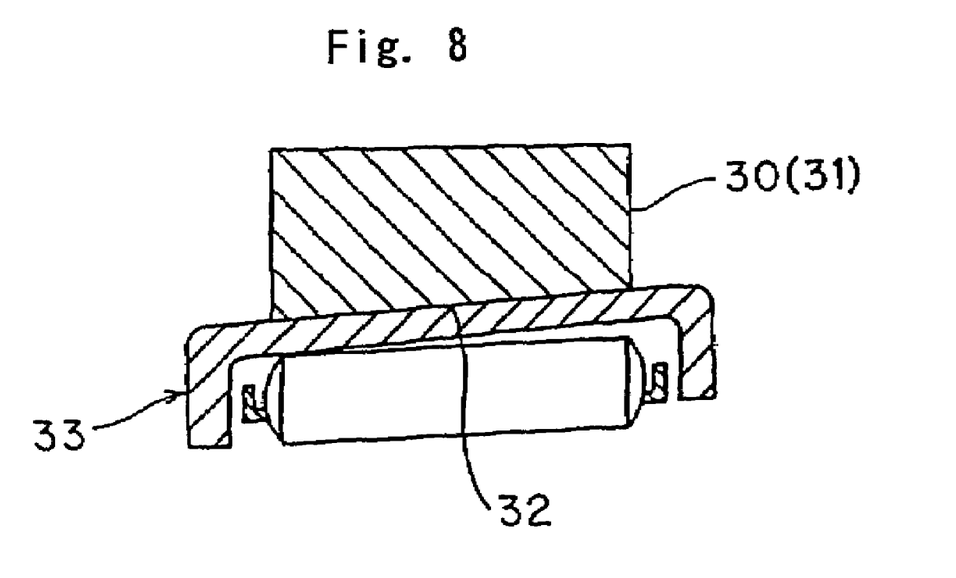
FIG. 8 is a fragmentary side sectional view, on an enlarged scale, of a portion of another conventional connecting rod.

To alleviate the above discussed problem, a connecting rod has been suggested in the Japanese Patent Application No. 2001-133940, which is formed by the use of a blanking technique with a fine blanking press. With the fine blanking press, the proportion of the cut plane in the inner peripheral surface and the proportion of a shear plane in the same inner peripheral surface can be reduced and increased, respectively, and, therefore, as compared with the use of the standard blanking technique with the standard press, the possible tilt of the bearing member tending to occur during the press fitting can be reduced. However, since the fine blanking press is a special tool, the use thereof tends to result in increase of the manufacturing cost. Also, even with the fine blanking press, influences brought about by the cut plane are so inevitable that as exaggeratedly shown in FIG. 8, the inner peripheral surface 32 in one or both of the big and small end portions 30 and 31 tends to be tapered. For this reason, when the bearing member 33 is press-fitted in the inner peripheral surface 32, the bearing member 33 tilts to some degree.

SUMMARY OF THE INVENTION

In view of the foregoing, the present invention has for its object to provide a connecting rod assembly that can be manufactured easily and inexpensively and also to provide a bearing-equipped connecting rod using the same.

To this end, the present invention provides a connecting rod assembly which includes a plurality of separate rod segments each having a big end portion, a small end portion and a shank portion intervening between the big and small end portions. The separate rod segments are laminated together to provide a laminated rod structure, and a ring member is press-fitted to each of the big and small end portions of the respective separate rod segments forming the laminated rod structure to thereby integrate the separate rod segments together. Each of the separate rod segments is preferably in the form of, for example, an elongated flat plate member formed from a steel plate by the use of a blanking technique.

According to the present invention, since the separate rod segments are laminated with the ring members press-fitted in the big and small end portions of those separate rod segments to thereby integrate, i.e., firmly and tightly connect the latter together with the ring members press-fitted in the big and small end portions of the laminated rod structure, that is, all of the separate rod segments integrated together, even though an inner peripheral surface of a bearing hole or bore defined in each of the big and small end portions for receiving the corresponding ring member under interference fit is inclined, such inclination of the inner peripheral surfaces of the bearing bores in the big and small end portions of the laminated rod structure can be eliminated to allow the respective ring members to integrate the separate rod segments together without being inclined.

By way of example, where each of the separate rod segments is employed in the form of, for example, an elongated flat plate member formed from a steel plate by the use of a blanking technique, it is often observed that a cut surface defining the respective inner peripheral surface of the bearing bore in each of the big and small end portions, which is left by blanking with a standard blanking press, tends to be slightly inclined. However, the use of the separate rod segments involves a relatively small thickness of each of the separate rod segments to be employed and, therefore, any undesirable step delimited between a shear plane and a cut plane can advantageously be minimized so that when the separate rod segments are eventually laminated and integrated together to provide the laminated rod structure, the individual cut planes in those separate rod segments can be dispersed. Consequently, according to the present invention, inclination appearing in the inner peripheral surface of each of the bearing bores in the big and small end portions of the resultant laminated rod structure is advantageously avoided.

Also, even though indentations are left by the press work on the cut plane of the inner peripheral surface of each of the bearing bores in the big and small end portions, insertion of the corresponding ring member under interference fit is effective to avoid any possible adverse influence on the resultant bearing surface. For this reason, the present invention allows an elongated flat plate member, formed from a steel plate by the use of a blanking technique, to be employed for each of the separate rod segments, thereby eliminating the need to employ a post processing step such as grinding or polishing to be effected to the big and small end portions of the laminated rod structure. Also, the present invention substantially eliminate the use of a special press or a press machine such as a fine blanking press and, therefore, is effective to manufacture the connecting rod assembly easily and inexpensively.

In the connecting rod assembly of the structure described above, the separate rod segments may be of an identical shape. Where the separate rod segments of an identical configuration are employed, the separate rod segments can be prepared by the use of the same press machine, allowing the same processing to be employed for the manufacture of the separate rod segments and, also, allowing the processing to be simplified.

Where the separate rod segments of an identical configuration are employed, the separate rod segments are preferably selected as a set of the rod segments allocated on and produced from a single steel plate by blanking with the use of the same press.

Even though a plurality of components of an identical configuration are prepared from the same material with the use of the same press die, it often occurs that the components initially blanked from the material at a certain time and the components blanked from the material at a different time may differ from each other in dimension with respect to a desired target value even though it is within an allowance, due to a number of factors such as a feed error, a different prehension of characteristics of the material and so on. In other words, the precise dimensions of the press work products may vary depending on when they are manufactured even though they are prepared from the same material with the use of the same press machine. Accordingly, the use of sets of the rod segments selected from a number of separate plate-shaped rods manufactured at the same timing to assembly the laminated rod structure is effective to eliminate a varying dimension of the separate rod segments employed in each of the resultant laminated rod structures and, thus, the precisely assembled connecting rod can eventually be obtained.

In a preferred embodiment of the present invention, each of the separate rod segments is a component prepared from a plate member by means of a blanking operation, wherein the two rod segments respectively occupying front and rear positions of the laminated rod structure have shear drops, left by a press work, that are oriented outwardly of the connecting rod.

The cut surface left by the press work is susceptible to formation of a shear drop, a shear plane, a cut plane and a burr that continue to each other in the order from the direction in which a press is advanced, resulting in the cut plane being tapered with low precision while the shear drop is left by shear with high precision. Also, the cut plane is so inclined as to represent a tapered plane flaring in a direction in which the punch leaves behind the plate member and, therefore, a portion of the shear plane represents a small diameter as compared with that at the cut plane.

Because of the reason discussed above, if with respect to the two separate rod segments positioned on front and rear sides of the resultant laminated rod structure, those two separate rod segments are so designed and so laminated that respective shear drops left by the press work can be oriented outwardly of the laminated rod structure, the shear plane can be located at opposite end portions of the inner peripheral surface of the bearing bore in each of the big and small end portions of the laminated rod structure with respect to the direction of thickness of the laminated rod structure and, hence, a high precision in lamination can be obtained. Also, that portion of the high precision represents the smallest diameter. Thus, the presence of that portion of a small diameter with high precision at the opposite ends of the bearing bores allows the ring member to be press-fitted thereinto without being inclined. In other words, the cylindricity of the generatrix of a bearing mounting portion where the corresponding ring member is press-fitted can be secured, allowing the ring member to be press-fitted precisely. Also, the burrs can be located on one side of lamination and will not be exposed to the outside from front and rear surfaces of the connecting rod, thereby eliminating influences brought about by the burrs.

The present invention also provides a bearing-equipped connecting rod in which the connecting rod assembly having any one of the structural features as discussed above is employed, wherein the ring member is an outer race of a shell type bearing member and the shell type bearing member is press-fitted to each of the big and small end portions of the laminated rod structure defined by the separate rod segments.

Where the shell type bearing members are used with their outer races used as the corresponding ring members to integrate the separate rod segments together, there is no need to employ any ring members that are separate from the bearing members. Thus, according to the present invention, it is possible to provide a light-weight bearing-equipped connecting rod with the number of component parts minimized.

The present invention further provides a bearing-equipped connecting rod in which the connecting rod assembly having any one of the structural features as discussed above is employed, wherein the ring member is a solid hollow cylinder and a needle roller with a cage or retainer disposed inside the solid hollow cylinder. Even with this structure, the ring members function as an outer race of each of the rolling bearing members and, therefore, the necessity of use of any ring member separate from the outer race for use in connection can advantageously be eliminated.

Furthermore, the present invention provides a bearing-equipped connecting rod in which the connecting rod assembly having any one of the structural features as discussed above is employed, wherein the ring member is a dry metal that serves as a plain bearing. According to this structure, the ring member functions as a plain bearing and, therefore, the use of any ring member separate from the plain bearing for use in connection can advantageously be eliminated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
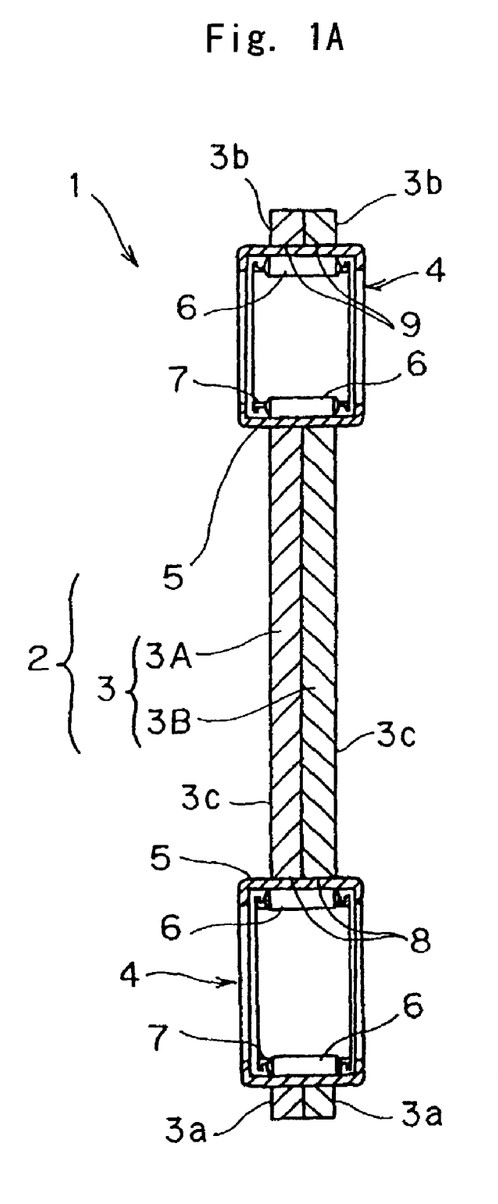
FIG. 1A is a side sectional view of a bearing-equipped connecting rod according to a first preferred embodiment of the present invention.
Figure 1B:
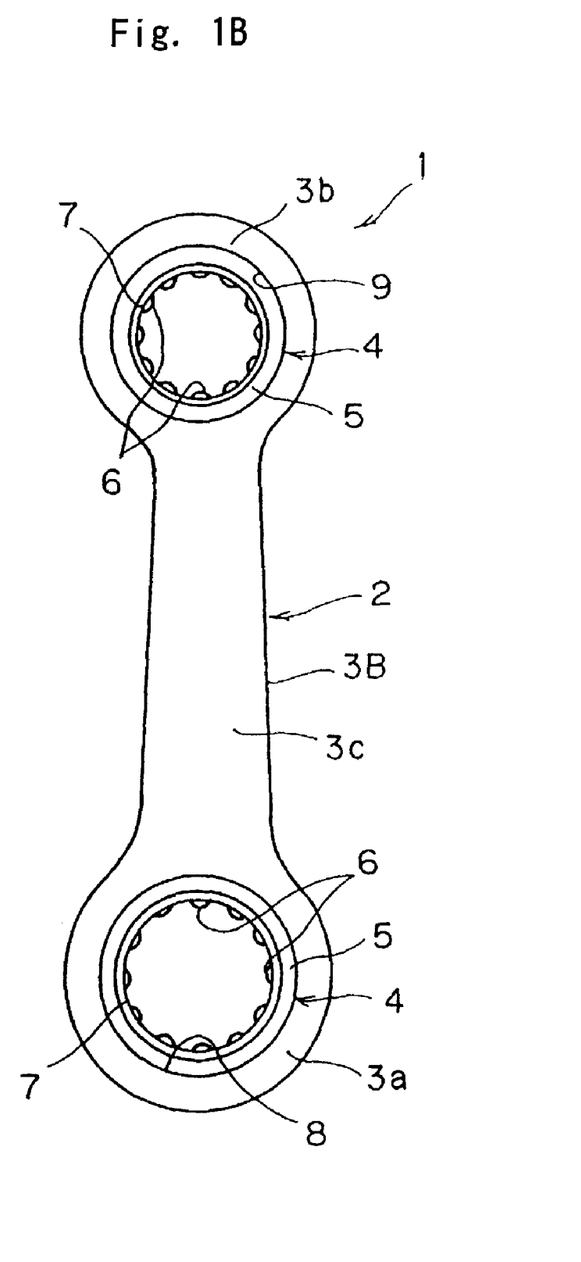
FIG. 1B is a front elevational view of the bearing-equipped connecting rod shown in FIG. 1A.

A first preferred embodiment of the present invention will be described with particular reference to FIGS. 1 to 3. A connecting rod assembly 2 shown therein includes a laminated rod structure 3 constructed of a plurality of, for example, two separate rod segments 3A and 3B of an identical configuration each having a big end portion 3a, a small end portion 3b and a shank portion 3c positioned between the big and small end portions 3a and 3b. The separate rod segments 3A and 3B are integrated together to complete the laminated rod structure 3 by means of respective ring members 5 press-fitted into the big end portions 3a and the small end portions 3b. In other words, the separate rod segments 3A and 3B are firmly connected together by means of the ring members 5

The separate rod segments 3A and 3B are made of flat plate members that are identical in shape and structure. The big end portion 3a of each of the rod segments 3A and 3B has a round bearing hole 8 defined therein whereas the small end portion 3b of each of the rod segments 3A and 3B has a round bearing hole 9 defined therein. There are no axially protruding flange portions formed integrally around the round bearing holes 8 or 9. While the separate rod segments 3A and 3B are held in contact with each other with the round bearing holes 8 in the respective big end portions 3a aligned with each other and, also, with the round bearing holes 9 in the respective small end portions 3b aligned with each other, bearing members 4 are press-fitted into the inner peripheral surface of the aligned round bearing holes 8 and the aligned round bearing holes 9, respectively, to integrate the separate rod segments 3A and 3B together to thereby complete the laminated rod structure 3. Each of the bearing member 4 is in the form of a shell type bearing having an outer race that defines the corresponding ring member 5 referred to above, and a plurality of rolling elements 6 retained by a ring-shaped cage 7. The rolling elements 6 are capable of rolling and moving along a raceway in the form of an inner peripheral surface of the outer race that is defined by the ring member 5. Each of the ring members 5 defining the outer race of each of the shell type bearing members 4 is prepared from a steel plate by the use of any known press work and has its opposite ends formed integrally with respective radially inwardly extending collars 5a.

Each of the separate rod segments 3A and 3B is prepared from a steel plate by the use of a blanking technique and is each two of a number of separate plate-shaped rods allocated on and manufactured from a single steel plate by means of a blanking operation using the same press.

Figure 3:
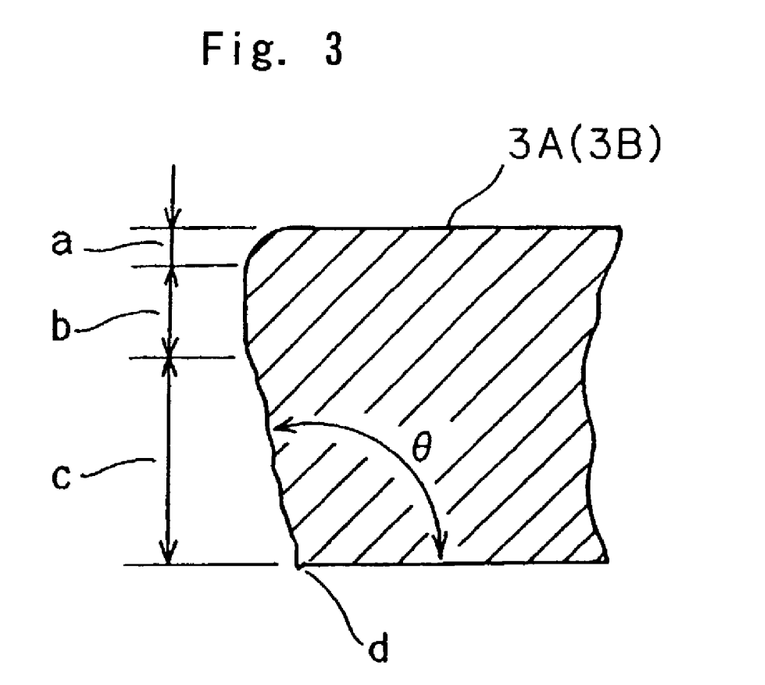
FIG. 3 is a fragmentary sectional view showing a surface finish formed after blanking of a separate rod segment forming a part of the bearing-equipped connecting rod.

A cut surface defining an outer peripheral surface of each of the separate rod segments 3A and 3B and an inner peripheral surface of each of the round bearing holes 8 and 9 in each of the separate rod segments 3A and 3B, which is left by blanking, is defined by a shear plane b and a cut plane c as shown in FIG. 3 on an enlarged scale. Where each of the separate rod segments 3A and 3B is prepared by the use of any standard press work, the cut surface left by the press work is defined by a shear drop a, a shear plane b and a cut plane c that continue to each other in the order from the direction in which a punch is advanced, with a burr d left at an edge from which the punch leaves behind the steel plate used to produce the respective rod segments 3A and 3B. In this cut surface, the cut plane c is inclined a certain angle θ so as to flare in a direction in which the punch leaves behind the steel plate and, hence, represents a tapered plane.

Figure 2:
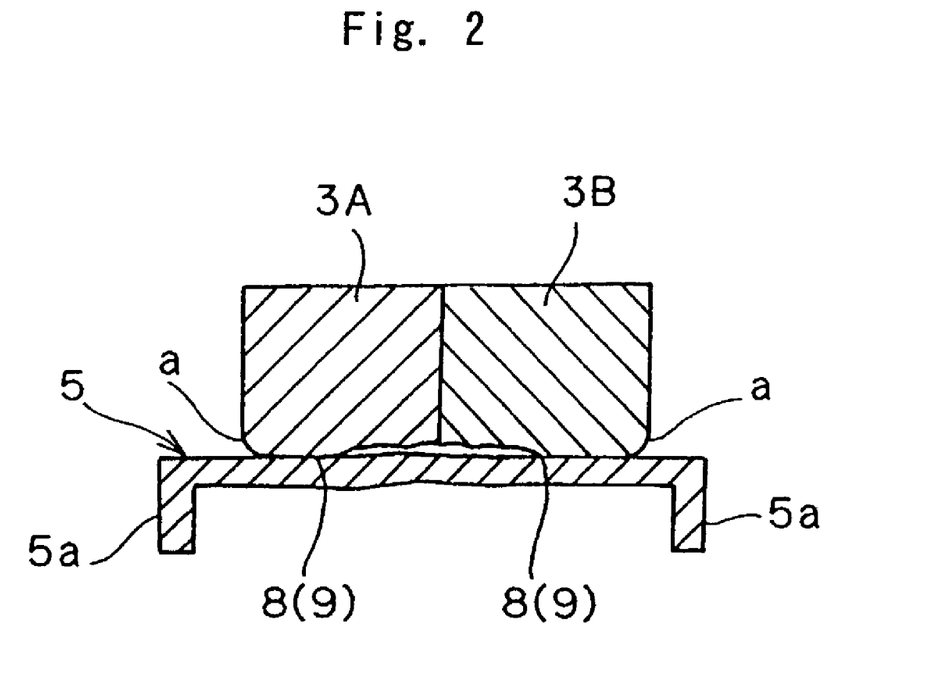
FIG. 2 is a fragmentary sectional view, on an enlarged scale, of a portion of the bearing-equipped connecting rod.

In view of the above, in the illustrated embodiment in which the two separate rod segments 3A and 3B are laminated together to provide the laminated rod structure 3, the separate rod segments 3A and 3B forming front and rear surfaces of the connecting rod assembly 2 are so designed and so laminated that respective shear drops a left by the press work can be oriented outwardly of the laminated rod structure 3 as shown in FIG. 2. By so doing, flared sides of the inner peripheral surfaces of the round bearing holes 8 and 9 in the respective separate rod segments 3A and 3B can be oriented in a laminating direction in which the separate rod segments 3A and 3B are laminated together.

With the connecting rod assembly 2 of the structure described above, since the laminated rod structure 3 is defined by laminating together the separate rod segments 3A and 3B of the identical structure prepared by the use of the press work, the individual rod segments 3A and 3B can have a small thickness and, correspondingly, a step delimited between the shear plane and the cut plane which would be left by the press work can be minimized advantageously and, also, the cut planes can be dispersed circumferentially. Because of this, even with the standard press work, the precious connecting rod assembly 2 can be obtained with no tilt of the ring members 5 occurring therein. Thus, since the standard press work can be employed in the practice of the present invention, the simple and inexpensive connecting rod assembly 2 can be manufactured with no need to employ special press dies or press machines necessary for fine blanking. In addition, since the separate rod segments 3A and 3B are firmly integrated together by inserting the ring members 5 under interference fit without allowing them to separate or displace from each other, there is no need to bond or weld the separate rod segments 3A and 3B together and, therefore, the manufacture of the connecting rod assembly 2 can be easily and inexpensively manufactured. Since in the illustrated embodiment each of the ring members 5 is defined by the outer race of the corresponding bearing member 4, there is no need to prepare the ring members separate from the bearing members and, therefore, an otherwise increase of the number of component parts can be avoided advantageously.

Moreover, since the separate rod segments 3A and 3B are selected as a pair of two rod segments allocated on and produced from a single steel plate by blanking with the use of the same press, any possible inconvenience in which dimension of press work products varies as a press work time passes can be minimized. Because of this, difference in dimension between the separate rod segments 3A and 3B that are used to form the single connecting rod assembly 2 can be minimized to allow a precise connecting rod 1 to be assembled.

Since the separate rod segments 3A and 3B forming the laminated rod structure 3 are so arranged and so laminated that the shear drops a left by the press work are oriented outwardly, that is, oriented so as to appear on front and rear surfaces of the resultant connecting rod, the respective enlarged sides of the inner peripheral surfaces of the round bearing holes 8 and 9 are oriented inwardly and, therefore, the cylindricity of the generatrix of a bearing mounting portion can be secured, allowing the bearing member 4 to be precisely press-fitted into the corresponding round bearing holes 8 and 9. Also, the burrs d can be crushed by contact at a center point and, therefore, any undesirable effect which would be brought about by the presence of the burrs d can be eliminated. Considering that the shear drops a come outside, a risk of a hand being wounded in contact with the burrs can be prevented advantageously.

Figure 4:
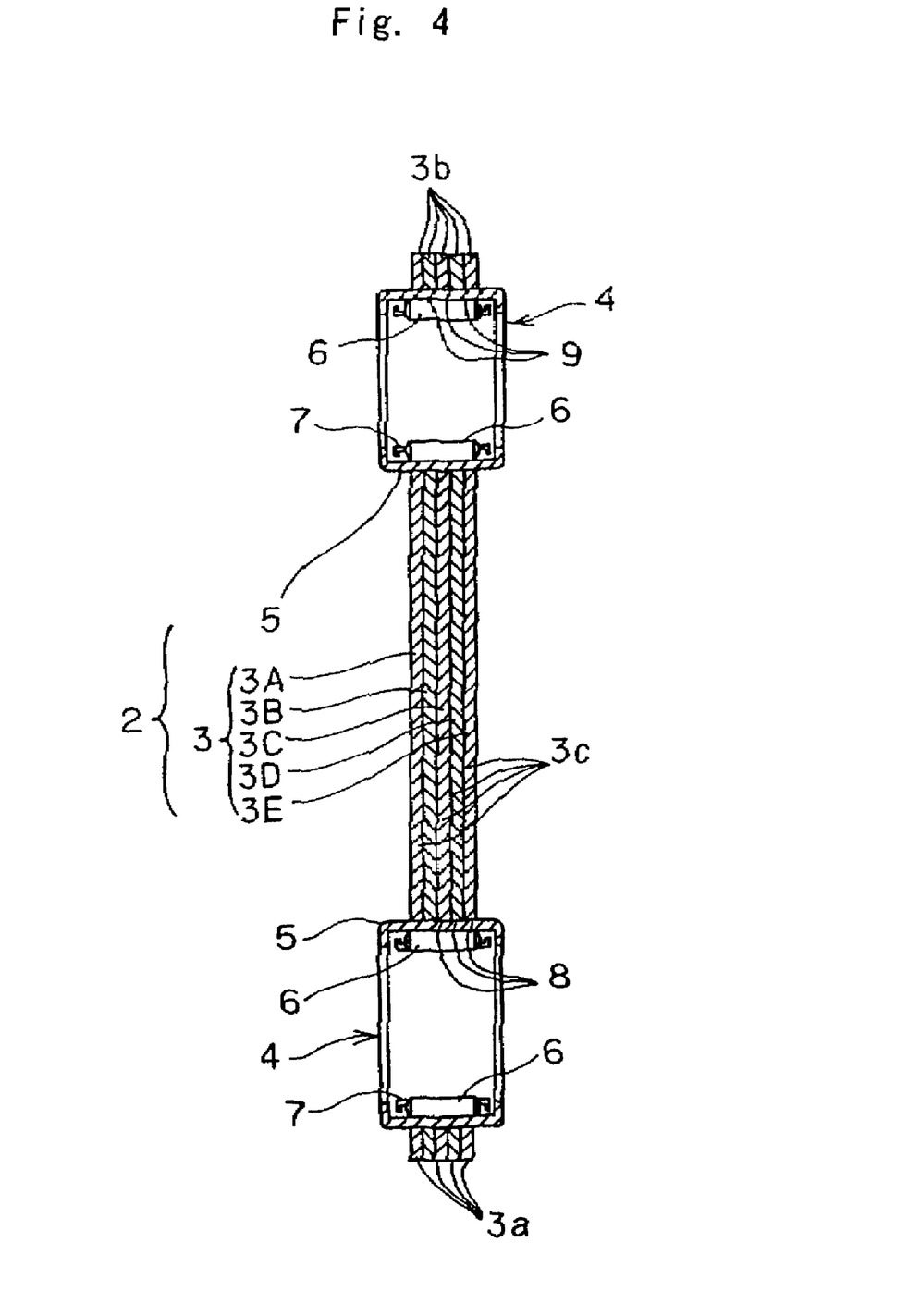
FIG. 4 is a side sectional view of the bearing-equipped connecting rod according to a second preferred embodiment of the present invention.

FIG. 4 illustrates a second preferred embodiment of the present invention. In this embodiment, five separate rod segments 3A to 3E are employed to form the laminated rod structure 3 of the connecting rod assembly 2. Even in this embodiment, of the five separate rod segments 3A to 3E, the two rod segments 3A and 3E occupying front and rear positions of the connecting rod assembly 2 are so arranged and laminated that the shear drops a, left by the press work, are oriented outwardly of the connecting rod 1. Also, even where three or more separate rod segments 3A to 3E are laminated together to define the laminated rod structure 3, the separate rod segments 3A to 3E are so selected as a set of the rod segments, 5 rod segments in this case, allocated on and manufactured from a single steel plate by blanking with the use of the same press as to eventually form the connecting rod 1. Other structural features of the connecting rod 1 shown in FIG. 4 are similar to those in the previously described embodiment.

According to the second embodiment shown in and described with reference to FIG. 4, since the five separate rod segments 3A to 3E are employed to form the laminated rod structure 3 of the connecting rod assembly 2, and where the separate rod segments 3A to 3E are prepared by blanking, each of the separate rod segments 3A to 3E can be prepared from a single steel sheet or plate of a relatively small thickness with the step between the shear plane and the cut plane minimized and, therefore, as compared with that in the previously described embodiment, the bearing-equipped connecting rod can easily be manufactured precisely. It is to be noted that although in describing the second embodiment reference has been made to the use of five rod segments, the number of the rod segments to form the laminated rod structure may not be always limited to five and the present invention can be equally applied to the use of two or more separate rod segments. Specifically, the particular number of the separate rod segments to be used to form the laminated rod structure should be chosen in consideration of the manufacturing cost and/or the shape required.

Figure 5:
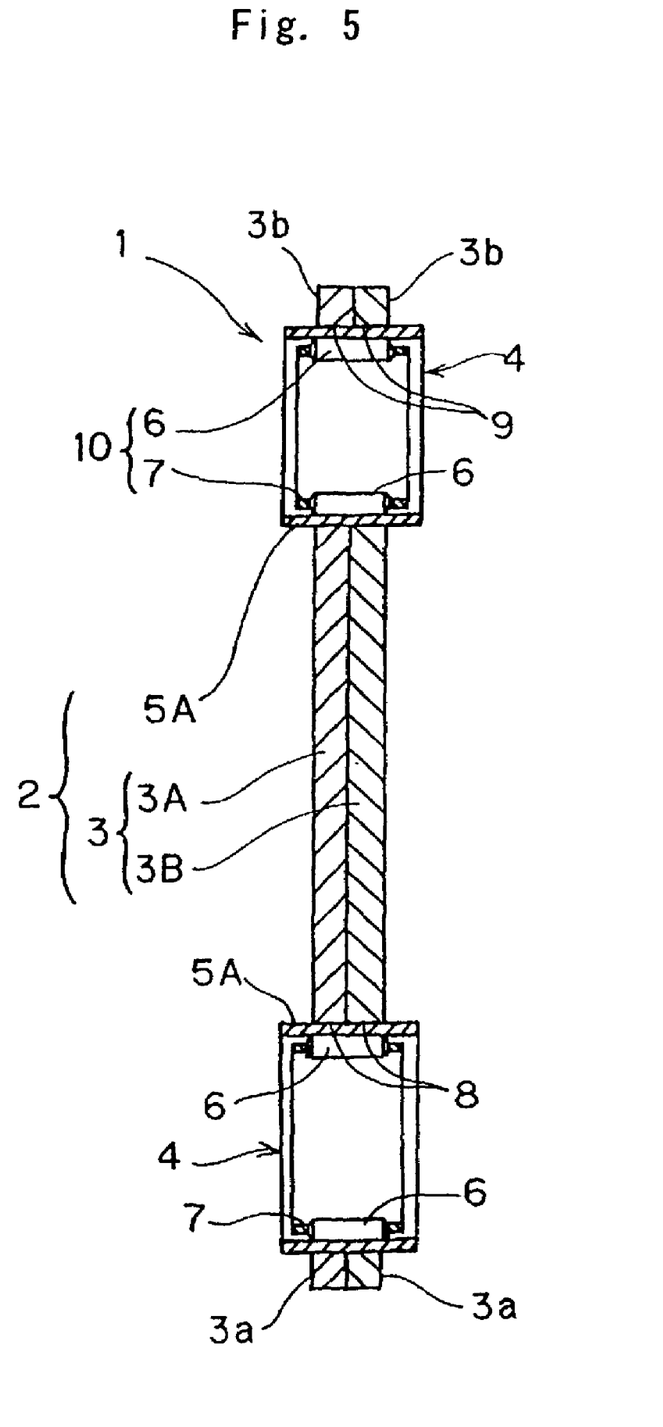
FIG. 5 is a side sectional view of the bearing-equipped connecting rod according to a third preferred embodiment of the present invention.

FIG. 5 illustrates a third preferred embodiment of the present invention. The bearing-equipped connecting rod 1 according to this third embodiment is similar to the bearing-equipped connecting rod 1 shown in and described with reference to FIG. 1, except that in the third embodiment each of the bearing members 4 is of a type wherein the outer race 5A is in the form of a solid hollow cylinder and a needle roller with a cage 10 are arranged inside the outer race 5A. In other words, as the ring member that is press-fitted into the aligned bearing holes 8 or 9 in each of the big and small end portions 3a and 3b of the separate rod segments 3A and 3B, the solid hollow cylinder 5A is employed. It is to be noted that the needle roller with the cage 10 is an assembly of needle rollers 6 retained non-displaceably by a roller cage 7. Other structural features of the bearing-equipped connecting rod 1 according to the third embodiment are similar to that according to the first embodiment.

According to the third embodiment shown in and described with reference to FIG. 5, as is the case with the first embodiment, the connecting rod assembly 2 can be manufactured easily and inexpensively with precision and the bearing-equipped connecting rod 1 can be easily and inexpensively constructed.

Figure 6:
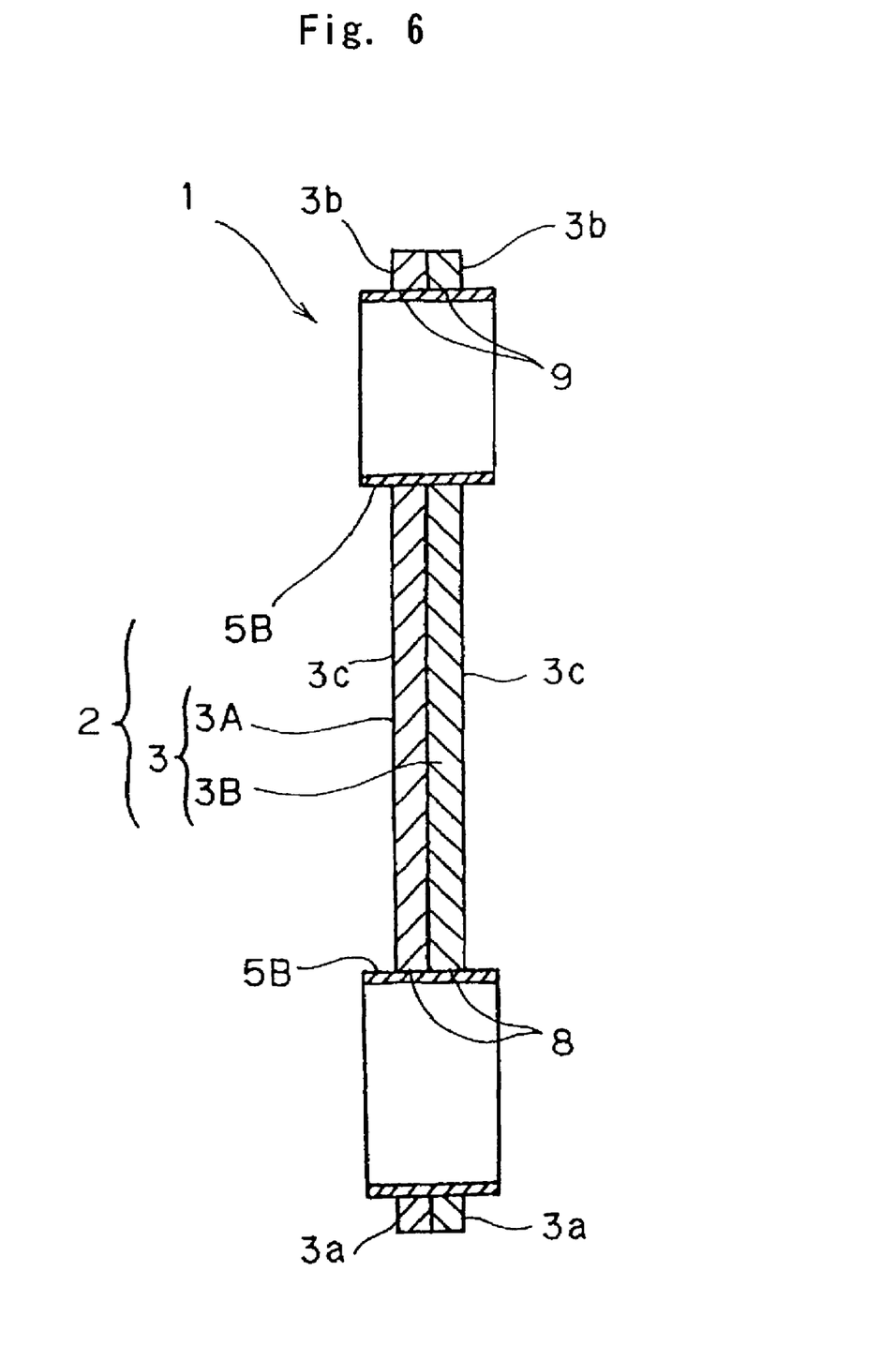
FIG. 6 is a side sectional view of the bearing-equipped connecting rod according to a fourth preferred embodiment of the present invention.

FIG. 6 illustrates a fourth preferred embodiment of the present invention. The bearing-equipped connecting rod 1 according to this fourth embodiment is similar to the bearing-equipped connecting rod 1 according to the previously described first embodiment, except that in the fourth embodiment, as the ring member that is press-fitted into the aligned bearing holes 8 or 9 in each of the big and small end portions 3a and 3b of the separate rod segments 3A and 3B, a dry metal 5B serving as a plain bearing is employed. Other structural features of the bearing-equipped connecting rod according to the fourth embodiment are similar to those according to the first embodiment.

Even with this embodiment, as is the case with the first embodiment, the connecting rod assembly 2 can be manufactured easily and inexpensively with precision and the bearing-equipped connecting rod 1 can be easily and inexpensively constructed.

It is to be noted that even in each of the third and fourth embodiments shown in and described with reference to FIGS. 5 and 6, respectively, the number of the separate rod segments to be used to form the laminated rod structure may be chosen as desired.

It is also to be noted that although in any one of the foregoing embodiments the ring members press-fitted to the separate rod segments to thereby integrate them together have been used in the form of component parts of the bearing members such as, for example, the outer races thereof, the present invention can be equally applied to the structure in which a bearing member is disposed on an inner peripheral surface of each of the ring members that are to be press-fitted in the big and small end portions of the separate rod segments.

It is further to be noted that in addition to integration of the separate rod segments by means of the ring members, the separate rod segments may be firmly connected together at any other location or locations so that the resultant bearing-equipped connecting rod can be reinforced.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A connecting rod assembly, comprising:
    three or more separate rod segments each having
        a big end portion formed with a first hole and having no axially protruding flange portion formed integrally around the first hole,
        a small end portion formed with a second hole and having no axially protruding flange portion formed integrally around the second hole, and
        a shank portion intervening between the big and small end portions, said separate rod segments being laminated to contact adjacent rod segments, to provide a laminated rod structure; and
        a ring member press-fitted into each of the first and second holes of the respective separate rod segments forming the laminated rod structure to thereby integrate the separate rod segments together.

2. The connecting rod assembly as claimed in claim 1, wherein the separate rod segments are of an identical shape.

3. A bearing-equipped connecting rod utilizing the connecting rod assembly as claimed in claim 1, wherein the ring member is an outer race of a shell type bearing member and the shell type bearing member is press-fitted to each of the big and small end portions of the laminated rod structure defined by the separate rod segments.

4. A bearing-equipped connecting rod utilizing the connecting rod assembly as claimed in claim 1, wherein the ring member is a solid hollow cylinder and a needle roller with a cage disposed inside the solid hollow cylinder.

5. A bearing-equipped connecting rod utilizing the connecting rod assembly as claimed in claim 1, wherein the ring member is a dry metal that serves as a plain bearing.

6. A connecting rod assembly, comprising:
    three or more separate rod segments
        each rod segment having a big end portion, a small end portion, and a shank portion intervening between the big and small end portions,
        each big end portion and each small end portion having a hole therethrough, and
            no axially protruding flange portion formed integrally around the hole,
        the separate rod segments being laminated to contact adjacent rod segments, to provide a laminated rod structure, the respective big end portions, small end portions, and holes being aligned; and
    ring members, respectively press-fitted through the holes of each of the big and small end portions of the laminated rod structure, to secure the separate rod segments together.

* * * * *